United States Patent [19]

Höhlein et al.

[11] 4,382,114

[45] May 3, 1983

[54] METHOD OF PRODUCING METAL EFFECT LACQUERINGS AND SHEETS TREATED WITH WEATHER-RESISTANT MULTICOAT METAL EFFECT LACQUERINGS

[75] Inventors: Peter Höhlein, Kempen; Walter Uerdingen, Leverkusen; Bernd Peltzer, Krefeld; Gerhard Mennicken, Leverkusen, all of Fed. Rep. of Germany

[73] Assignee: Bayer Aktiengesellschaft, Leverkusen, Fed. Rep. of Germany

[21] Appl. No.: 241,878

[22] Filed: Mar. 9, 1981

[30] Foreign Application Priority Data

Mar. 20, 1980 [DE] Fed. Rep. of Germany ....... 3010719

[51] Int. Cl.³ .................. B32B 27/40; C08G 18/81; C08G 18/10; C08G 18/70
[52] U.S. Cl. ............................ 428/423.1; 427/407.1; 427/409; 428/328; 428/422.8; 428/424.2; 528/45; 528/59; 528/67; 528/73
[58] Field of Search ................ 427/409, 407.1; 428/425.9, 422.8, 423.1, 424.2, 328; 528/45, 59, 67, 73

[56] References Cited

U.S. PATENT DOCUMENTS

| | | | |
|---|---|---|---|
| 3,639,147 | 2/1972 | Benefiel et al. | 427/409 X |
| 3,789,037 | 1/1974 | Miller | 260/16 |
| 4,020,216 | 4/1977 | Miller | 428/425 |
| 4,226,901 | 10/1980 | Sugiura et al. | 427/385.5 |
| 4,289,813 | 9/1981 | Blomeyer et al. | 427/385.5 |

FOREIGN PATENT DOCUMENTS 1343812  2/1964  France.

OTHER PUBLICATIONS

Temple C. Patton, Alkyd Resin Technology, Interscience Publishers, John Wiley & Sons, New York, London, 1962, pp. 1–3 and 115–117.
Wagner Sarx 4th Edition, Lackkunstharze, Karl Hanser Verlag, Munich, 1959, pp. 83–123.
Ullmanns Encyclopodie des technischen Chemie, vol. 14, 1963, pp. 80–106.

*Primary Examiner*—Michael R. Lusignan
*Attorney, Agent, or Firm*—Gene Harsh; Lawrence S. Pope; Thomas W. Roy

[57] ABSTRACT

The present invention relates to a process for the production of metal effect lacquerings having improved weather-resistance by the multilayered lacquering of various substrates, using a clear layer as top coat and a lacquer containing metal pigments to form the outer layer of the multilayered lacquering which is covered by the layer of clear lacquer, characterized in that the clear lacquer used is one the main binder of which is a two-component system consisting of:

(a) a polyol component consisting essentially of polyester polyols having a low aromatic component content and optionally also polyacrylate polyols; and
(b) a polyisocyanate component having biuret and/or isocyanurate groups, as well as aliphatically-bound isocyanate groups which may be blocked with isocyanate blocking agents. The present invention also relates to the substrates coated with these lacquers.

8 Claims, No Drawings

METHOD OF PRODUCING METAL EFFECT LACQUERINGS AND SHEETS TREATED WITH WEATHER-RESISTANT MULTICOAT METAL EFFECT LACQUERINGS

BACKGROUND OF THE INVENTION

1. Field of the Invention

This invention relates to a method of producing multilayered metal effect lacquerings with improved weather-resistance in which metal effect lacquer coats are treated with a selected top coat lacquer, and to sheets having such multilayered lacquer finishes.

2. Description of the Prior Art

Multilayered lacquer finishes built up of several lacquer layers are used, for example, for lacquering motor vehicles. The coat of clear lacquer forming the last, outermost layer of the multilayered lacquering is generally stoved in. It is obtained from clear lacquers which generally contain poly(meth)acrylates or copolymers thereof as film-formers. They are obtained by copolymerization of (meth)acrylic acid esters of monohydric alcohols with (meth)acrylic acid esters which still contain functional hydroxyl groups and which may also contain as copolymer component other comonomers such as styrene, vinyl toluene, vinyl esters and small proportions of monomers containing carboxyl groups. These acrylate resins are used, for example, in combination with polyisocyanates in organic solvents.

Other clear lacquers contain alkyd resins in addition to the polyacrylate resins. These alkyd resins are synthesized from phthalic acid and polyols which are modified with various fatty acids or other monocarboxylic acids and may also be hardened in combination with polyisocyanates (Temple C. Pattan, Alkyd Resin Technology, Interscience Publishers, John Wiley & Sons, New York, London, 1962; Wagner-Sarx, Lackkunstharze, 4th Edition, Karl Hanser Verlag, Munich, 1959; Ullmanns Encyclopadie der technischen Chemie, Vol. 14, pages 80–106, 1963).

These known clear lacquers are distinguished by the hardness and elasticity thereof. When used as top coat lacquers in a multilayered lacquering in which the last layer contains metal pigments, in other words for a metal effect lacquering, the known clear lacquers tend to form cracks on exposure to weathering and UV light such as occurs in sunny regions. Clear lacquers obtained from acrylate resins also tend to become matt after weathering and exposure to UV light in weathering tests, and this renders the metallic effect unsightly.

It is an object of the present invention to provide new clear lacquers which are suitable for use as top coat lacquers for multilayered metal effect lacquerings, show no tendency to form cracks and impart improved weather-resistance to the lacquer finishes.

This problem may be solved according to the present invention by using, for the production of multilayered metal effect lacquerings, clear lacquers, the binders of which have the composition described in more detail below.

SUMMARY OF THE INVENTION

The present invention relates to a process for the production of metal effect lacquerings having improved weather-resistance by the multilayered lacquering of various substrates, using a clear layer as top coat and a lacquer containing metal pigments to form the outer layer of the multilayered lacquering which is covered by the layer of clear lacquer, characterized in that the clear lacquer used is one the main binder of which is a two-component system comprising:

(a) a polyol component consisting essentially of polyester polyols having a low aromatic component content and optionally also polyacrylate polyols; and (b) a polyisocyanate component having biuret and/or isocyanurate groups, as well as aliphatically-bound isocyanate groups which may be blocked with isocyanate blocking agents.

The present invention also relates to sheets having weather-resistant multilayered metal effect lacquerings in which the lacquering consists of at least one layer of lacquer containing metal pigments and one layer of top coat lacquer, characterized in that the layer of top coat lacquer has been obtained by coating the sheet which has been treated with a layer of lacquer containing metal pigments with a clear lacquer which is subsequently dried and in which the binder has the composition indicated above.

DETAILED DESCRIPTION OF THE INVENTION

In the context of the present invention, the term "polyester polyols" is used to denote compounds having hydroxyl groups and ester groups, i.e., in particular, compounds of this type known from polyurethane chemistry, such as saturated polyester polyols alkyd resins containing hydroxyl groups and optionally oil-modified, urethane-modified polyester polyols with hydroxyl groups and urethane-modified and optionally also oil-modified alkyd resins containing hydroxyl groups. In the context of the present invention, the term "low in aromatic content" denotes those polyester polyols with alcoholic hydroxyl groups the acid component of which comprises not more than about 30% by weight, preferably not more than about 20% by weight and most, preferably not more than about 15% by weight of aromatic carboxylic acids or those polyhydroxy polyacrylates which have monomers containing at the most about 20% by weight, preferably at the most about 15% by weight of aromatic groups present in a copolymerized form with nonaromatic monomers. Binder constituents (a) which are free from aromatic groups are preferably used according to the present invention, i.e., polyester polyols which are completely free from aromatic carboxylic acids and polyhydroxy polyacrylates which are free from aromatic monomers in a copolymerized form.

The use of polyester polyols or polyacrylate polyols having a low aromatic content as binders or as the main binder component (a) is an essential feature of the present invention.

Polyester polyols suitable for the process according to the present invention generally have an acid number of from about 0 to 150, preferably from about 0 to 50, and a hydroxyl number of from about 20 to 300, preferably from about 40 to 200.

Polyester polyols suitable for the purposes of the present invention include, for example, the reaction products of aliphatic and/or cycloaliphatic polycarboxylic acids or anhydrides thereof or lower alkyl or hydroxy alkyl esters with excess quantities of polyhydric aliphatic or cycloaliphatic alcohols thereof, which reaction products may be prepared in known manner. Aliphatic and cycloaliphatic polycarboxylic acids suitable for the preparation of these polyester polyols are in particular those corresponding to the following general formula:

$$R(COOH)_n$$

wherein

R represents an n-valent saturated aliphatic hydrocarbon group having from about 2 to 18, preferably from about 4 to 8, carbon atoms or a cycloaliphatic hydrocarbon group which is optionally olefinically unsaturated and has from about 4 to 18, preferably from about 6 to 10, carbon atoms; and n represents an integer of from about 2 to 4 preferably 2;

the various carboxyl groups being linked to different carbon atoms of group R.

Instead of using the above-mentioned carboxylic acids for preparing the polyester polyols, anhydrides or lower alkyl or hydroxy alkyl esters thereof may be used, as mentioned above. Cycloaliphatic carboxylic acids are preferred to the corresponding aliphatic carboxylic acids.

Suitable carboxylic acids include, for example, succinic acid; adipic acid; suberic acid; 1,18-octadecanedicarboxylic acid; cyclobutane-1,3-dicarboxylic acid; cyclohexane-1,2-dicarboxylic acid; cyclohexane-1,3-dicarboxylic acid; cyclohexane-1,4-dicarboxylic acid; tricyclodecane-dicarboxylic acid; endoethylene hexahydrophthalic acid; hexahydrophthalic acid; tetrahydrophthalic acid; 4-methyl-hexahydrophthalic acid; campheric acid; cyclohexane tetracarboxylic acid and cyclobutane tetracarboxylic acid. Monocarboxylic acids, such as benzoic acid, may also be used in minor quantities.

Suitable alcohols for the preparation of the polyester polyols include, for example, aliphatic and cycloaliphatic dihydric to tetrahydric alcohols having a molecular weight of from about 62 to 300 which may also contain ether oxygen bridges, such as ethylene glycol; 1,2-propylene glycol; trimethylene glycol; tetramethylene glycol; hexamethylene glycol; neopentyl glycol; diethylene glycol; triethylene glycol; dipropylene glycol; trimethylol ethane; trimethylol propane; glycerol; pentaerythritol; 1,4-dihydroxy cyclohexane; 1,3- and 1,4-bis-(hydroxymethyl)-cyclohexane; 4,4'-dihydroxy-dicyclohexyl-dimethylmethane; 3,3'-dimethyl-4,4'-dihydroxy-dicyclohexyl-dimethylmethane and 4,4'-bis-(hydroxymethyl)-dicyclohexyl-dimethylmethane. Particularly suitable polyester polyols are those based on 1,4-bis-(hydroxymethyl)-cyclohexane and/or those based on 4,4'-dihydroxy-dicyclohexyl-dimethylmethane.

Apart from such simple polyester polyols, urethane-modified polyester polyols may also be used as binder component (a) according to the present invention, that is to say, for example, reaction products of the exemplified polyester polyols with subequivalent quantities of organic diisocyanates, such as isophorone diisocyanate or hexamethylene diisocyanate.

Alkyd resins containing hydroxyl groups are also suitable binder components (a) according to the present invention, provided they satisfy the conditions indicated above as regards the aromatic group content. Known oil-modified alkyd resins are also suitable as binder component (a) according to the present invention, provided they conform to the above conditions concerning the hydroxyl number, acid number and aromatic group content. The corresponding urethane-modified alkyd resins may also be used as binder component (a).

Preparation of the polyester polyols suitable for the purposes of the present invention is carried out by known methods which have been described, for example, in the standard works, such as the following:

(1) Temple C. Pattan, Alkyd Resin Technology, Interscience Publishers, John Wiley & Sons, New York, London, 1962;

(2) Dr. Johannes Scheiber, Chemie and Technologie der kunstlichen Harze, Wissenschaftliche Verlagsgesellschaft mbH, Stuttgart, 1963;

(3) Hans Wagner - Hans-Friedrich Sarx, Lackunstharze, 4th Edition, Karl Hanser Verlag, Munich, 1959;

(4) Ullmanns Encyklopadie der technischen Chemie, Volume 14, pages 80 to 106, 1963.

In addition to the polyester polyols exemplified above, the binder components (a) according to the present invention may also contain polyacrylate polyols having hydroxyl numbers of from about 20 to 300, preferably from about 35 to 200, and osmometrically-determined molecular weights of from about 1,000 to 20,000. These polyacrylate polyols are known copolymers of olefinically unsaturated monomers which are free from hydroxyl groups and olefinically unsaturated monomers having aliphatically-bound hydroxyl groups.

Suitable monomers free from hydroxyl groups include, for example, styrene, -methylstyrene, ortho- and para-chlorostyrene, ortho-, meta- and para- methylstyrene, para-tertiary butyl styrene and optionally mixtures of the above; acrylic and methacrylic acid, alkyl esters having from 1 to 8 carbon atoms in the alcohol component, such as ethyl acrylate, methyl acrylate, n- and isopropyl acrylate, n-butyl acrylate, 2-ethylhexyl acrylate, 2-ethylhexyl methacrylate, isooctyl acrylate, tertiary butyl acrylate, methyl methacrylate, ethyl methacrylate, n- and isopropyl methacrylate butyl methacrylates, isooctyl methacrylate, vinyl esters of alkane monocarboxylic acids, e.g., vinyl acetate or vinyl propionate, acrylonitrile, (meth)acrylic acid amide, monomers optionally containing carboxylic acids, e.g., mono- and/or diesters of fumaric acid, itaconic acid or maleic acid with aliphatic alcohols having from about 1 to 8 carbon atoms or mixtures of such monomers.

Examples of suitable monomers having aliphatically-bound hydroxyl groups include: 2-hydroxyethyl-(meth)acrylate; 2-hydroxypropyl-(meth)acrylate, 4-hydroxybutyl-(meth)acrylate; trimethylolpropane mono(meth)acrylate, pentaerythritomono(meth)acrylate and mixtures thereof.

Preparation of the polyacrylate polyols, a term used in the present context to denote copolymers containing aliphatic hydroxyl groups, regardless of the content thereof of derivatives of acrylic acid or of methacrylic acid, may be carried out by copolymerization of the constituents by the conventional methods, preferably by radical polymerization, either solvent-free or in solution.

Polymerization may be carried out at temperatures of from about 70° to 160° C., preferably from about 100° to 150° C.

The monomers are built into the copolymer resin in substantially the same proportions in which they have been used for polymerization and the units incorporated by polymerization have a substantially statistical distribution.

Preferred initiators for carrying out the radical polymerization include, for example, symmetric aliphatic azo-compounds, such as azo-bis-isobutyric acid nitrile; azo-bis-2-methyl-valeronitrile; 1,1'-azo-bis-1-cyclohexane nitrile and 2,2'-azo-bis isobutyric acid alkyl esters; symmetrical diacyl peroxides, such as acetyl, propionyl or butyryl peroxide, benzoyl peroxides substituted with bromo, nitro, methyl or methoxy substituents, and lauroyl peroxide; symmetrical peroxydicarbonates, such as diethyl, diisopropyl, dicyclohexyl and dibenzyl peroxidicarbonate; tertiary butyl peroctoate or tertiary butyl peroctoate or tertiary butyl phenyl peracetate and peroxidicarbonates, such as tertiary butyl-N-(phenyl-peroxi)-carbamate or tertiary butyl-N-(2,3-dichloro or 4-chlorophenylperoxi)-carbamate. The following peroxides are also preferred: tertiary butyl hydroperoxide, ditertiary butyl peroxide, cumene hydroperoxide, dicumene hydroperoxide and tertiary butyl perivalate.

The initiators may be used in quantities of from about 0.2 to 15% by weight, based on the total quantity of monomers. The conventional molecular weight regulators may also be used for polymerizaton in quantities of from about 0.1 to 10% by weight, based on the total quantity of monomers.

If the solution is to be polymerized, inert solvents such as ethanol, propanol, isopropanol, n- or isobutanol, methyl ethyl ketone, toluene, xylene, butyl acetate, butyl glycol, etc. may be used. Emulsion polymerizations may also be carried out.

Polyhydroxy polyacrylates which have been prepared in a polyester polyol of the type exemplified above or in a solution of such a polyester polyol as reaction medium are also suitable. In this way, it is possible, especially when using weak solvents such as mineral spirits and/or aromatic hydrocarbons which are solvents for the polyester polyol but nonsolvents for the polyhydroxy polyacrylate, to obtain the polyhydroxy polyacrylate in the form of a dispersion of polymer micro-particles stably dispersed in the polyester polyol or its solution. Such dispersion may be used in the process according to the present invention, particularly if curing of the clear lacquer is carried out under the action of heat. In such a case, the dispersed polyhydroxy polyacrylate particles melt before they are cross-linked and, at the same time, become homogeneously distributed in the lacquer film so that clear top coat layers are obtained.

After preparation and any modification, the copolymers may be removed from volatile constituents at temperatures of from about 140° to 200° C. This may be carried out, e.g., in evaporator coils at normal pressure by injecting an inert gas, such as nitrogen or hydrogen, in quantities of from about 0.1 to 1 m$^3$ per kg of resin melt or in evaporation apparatus operating under vacuum, such as falling film evaporators, thin layer evaporators, evaporator screws, depressurizing evaporators or spray evaporators.

The binder components (a) according to the present invention generally contain from about 5 to 100% by weight, preferably from about 10 to 100% by weight, of one or more polyester polyols of the type exemplified and from about 0 to 95% by weight, preferably from about 0 to 80% by weight, of hydroxy polyacrylate of the type exemplified. In addition to these components, the binder component (a) may also contain minor quantities of other compounds carrying isocyanate-reactive groups, in particular aliphatically-bound hydroxyl groups. Such compounds include, for example, simple aliphatic and cycloaliphatic polyols which have been exemplified above for the preparation of the polyester polyols and which may be added as reactive diluents. Such simple aliphatic alcohols, however, are at most used, if at all, in quantities of up to about 35 OH equivalent percent, based on all of the hydroxyl-containing components present in binder component (a).

The binder components (b) according to the present invention are polyisocyanates containing isocyanurate and/or biuret groups and having aliphatically- and/or cycloaliphatically-bound isocyanate groups, in particular those based on hexamethylene diisocyanate or on 1-isocyanato-3,3,5-trimethyl-5-isocyanatomethyl-cyclohexane (isophorone diisocyanate). The above-mentioned lacquer polyisocyanates containing biuret and/or isocyanurate groups are prepared from the simple diisocyanates exemplified above by known methods. Lacquer polyisocyanates containing biuret groups may be prepared, for example, by the methods according to U.S. Pat. Nos. 3,124,605; 3,358,010; 3,903,126; 3,903,127 or 3,976,622. Isocyanurate polyisocyanates suitable for use as binder component (b) according to the present invention may be prepared by, for example, the methods according to U.S. Pat. No. 3,919,218 or German Auslegeschrift No. 1,954,093. The polyisocyanates may also be used in a blocked form with isocyanate blocking agents although such blocked polyisocyanates are less advantageous. Suitable blocking agents include, e.g., phenol, ε-caprolactam, diethyl malonate and ethyl acetoacetate.

Binder components (a) and (b) are preferably used in quantities corresponding to an NCO:OH equivalent ratio of from about 0.8:1 to 2.5:1, preferably from about 0.9:1 to 1.5:1, in the clear lacquers used according to the present invention. In practice, this means that the clear lacquers generally contain from about 5 to 45% by weight of component (b) and from about 95 to 55% by weight of component (a), based on the total quantity of components (a) and (b).

The clear lacquers according to the present invention generally contain solvent, i.e., the binder components (a) and (b) are used as solutions or dispersions in suitable lacquer solvents, such as butyl acetate, methyl isobutyl ketone, ethylene glycol monoethyl ether acetate, xylenes and/or mineral spirits. It is also conceivable, although by no means preferred, to neutralize the binder components (a) with bases, such as alkali metal hydroxides, ammonia, tertiary amines or quaternary ammonium bases if the binder components have a sufficiently high acid number, and to use them in the form of aqueous solutions or dispersions in which binder component (b) is dispersible. In that case, the polyisocyanates must, of course, be used entirely in a blocked form.

The clear lacquers used according to the present invention may, in addition to the above-mentioned components, also contain auxiliary agents and additives, such as viscosity regulating substances, antifoaming agents, levelling agents, catalysts for the NCO/OH addition reaction, UV absorbents, such as benzotriazoles, oxamides, benzophenols or diphenyl acrylonitrile acid esters, or antioxidants.

The clear lacquers which are preferred according to the present invention are two-component systems dissolved or dispersed in solvents which, when dried at temperatures of from about 0° to 120° C. for from about 5 to 60 minutes, form clear, transparent, hard elastic films having a high corrosion resistance to chemicals and UV light. It should be particularly mentioned that the lacquerings obtainable according to the present invention have an extremely low tendency to form cracks or tears.

Application of the clear lacquers is carried out by the conventional methods of lacquer technology, for example, by spraying, pouring, immersion or roller application. The lacquers are generally applied in such quantities that the films of clear lacquers when dry have thicknesses of from about 0.005 to 0.05 mm.

In the process according to the present invention, the clear lacquers are used according to the present invention to form a finishing layer on a multi-layered lacquering in which the topmost layer which is to be covered by the clear lacquer contains metal pigments. By coating this final layer with the clear lacquers according to the present invention, so-called "metal effect lacquerings" are obtained.

In order, for example, to obtain a metal effect lacquering on a motor vehicle, the car body is generally first coated with a primer by anodic or cathodic electrolytic immersion. After this layer has been stoved in and optionally rubbed down, a filler is applied which, after stoving, constitutes the substrate or surface to which the metal effect lacquering is to be applied.

The first coat of lacquer which contains the metal pigment and which may be colored is then applied to the surface of filler. The metal pigments contained in it may be in the form of powders or platelets of aluminum, brass, copper or other metals. Coloring in the various shades is achieved by using pigments and/or soluble dyes. The binder basis of this first lacquer coat may be of various types. Various known materials may be used for it, provided they bond firmly to the layer underneath it and to the layer of clear lacquer applied on top of it.

Each layer of the multilayer lacquering is dried before the next layer is applied although the clear lacquer is advantageously applied wet-on-wet to the undercoat of lacquer containing the metal pigments without this undercoat being first dried. Both layers of lacquer are then cured together at a temperature of from about 0° to 120° C. for a drying time of from about 6 to 60 minutes. If blocked polyisocyanates are used, the layer of clear lacquer is frequently stoved at higher temperatures, i.e., at up to about 200° C.

Such a multilayered lacquering has an exceptionally hard, scratch-resistant surface and is highly elastic. The surface has a high gloss which remains undiminished for a considerable time. The films are resistant to chemicals. The underlying film of lacquer covered by the clear lacquer according to the present invention provides improved resistance to atmospheric influences, such as moisture, heat and UV light. While a two-layered metal effect lacquering having a covering of clear lacquer containing an alkyd resin based on phthalic acid with aromatic groups showed cracks after only 650 hours in the weatherometer test (Cycle 17/3), a two-layered metal effect lacquering produced according to the present invention ws still intact after more than 2,000 hours.

The following Examples illustrate the process according to the present invention in more detail. (All percentages given are percentages by weight and all parts given are parts by weight).

EXAMPLES

EXAMPLE 1

(a) An oil-free polyestter having an acid number of about 10, a hydroxyl number of about 62 and a viscosity corresponding to an outflow time (DIN 53211, 50% in xylene) of from 120 to 130 seconds is prepared from 1,455 parts of hexahydrophthalic acid anhydride, 990 parts of benzoic acid, 990 parts of fatty acid, 728 parts of trimethylol propane and 757 parts of pentaerythritol by esterification under a nitrogen atmosphere at 200° C.

(b) 100 parts of the 60% solution of resin in xylene are weighed out and worked-up into a clear lacquer with the addition of 0.5 parts of a polyacrylate-based commercial levelling agent, 5.2 parts of a polyisocyanate containing isocyanurate groups and based on hexamethylene diisocyanate having an isocyanate content of about 20.7% by weight in the form of a 90% solution in xylene, 0.2 parts by weight of zinc octoate and 1.0 part by weight of a commercial heat stabilizer (sterically hindered phenol). This clear lacquer is diluted by the addition of 25.4 parts of a solvent mixture of ethylene glycol-monoethyl ether acetate, butyl acetate and xylene in proportions of 2:1:1. The NCO:OH molar ratio is 1:1.

EXAMPLE 2

(a) 1,020 parts of xylene are introduced into a glass vessel equipped with reflux condenser and heating, cooling and dosing devices and heated to 100° C. A mixture of 1,000 parts of methyl methacrylate, 120 parts of styrene, 350 parts of hydroxypropyl methacrylate, 282 parts of butyl acrylate and 18 parts of mercapto ethanol is added under a nitrogen atmosphere at 110° C. in the course of three hours. At the same time, 70 parts of tertiary butyl peroctoate in 164 parts of xylene are added separately within four hours.

The reaction mixture is then stirred for three hours at 110° C. and heated to the reflux temperature (about 140° C.) and maintained at this temperature for one hour. After filtration under pressure, a copolymer resin having a viscosity corresponding to an outflow time, DIN 53211, 50% in xylene, of from 120 to 130 seconds, a molecular weight of MN - 5430, a solids content of 60.3% and an OH number of about 46 is obtained.

The solids content was determined, as also in the case of all other copolymer resins described, by heating 1 g of resin solution in the form of a layer of about 50 μm in thickness on a metal lid 7.5 cm in diameter for one hour in a circulating air drying cupboard at 80° C.

(b) This copolymer resin was mixed with the polyester described above (Example 1) in the proportions of 80 parts of polyester to 20 parts of copolymer resin (60% solutions in each case) and worked-up into a clear lacquer as described above. This lacquer may be used as final coat for two-layered metallic surface lacquer systems. The resulting binder is diluted with a solvent mixture of ethyl glycol acetate, butyl acetate and xylene in proportions of 2:1:1. The molar NCO:OH ratio is 2:1.

EXAMPLE 3 (Comparison Example)

(a) Example 1(a) is repeated but hexahydrophthalic acid anhydride (1,455 parts) is replaced by an equimolar quantity of phthalic acid anhydride (1,398 parts). An analogous method is employed to produce a polyester resin having an acid number of 8.8, a hydroxyl number of 60, a viscosity equivalent to 124 seconds (DIN 53211, 50% in xylene) and a solids content of 60.4%.

(b) Employing a procedure analogous to that of Example 1(b), a clear lacquer is prepared from 100 parts of the 60% resin solution 3(a), 0.5 parts of levelling agent, 15.0 parts of polyisocyanate based on hexamethylene diisocyanate and containing isocyanurate groups, 0.2% by weight of zinc octoate, based on the binder, as catalyst and 1.0 part of heat stabilizer according to Example 1. This clear lacquer is diluted by the addition of 27.3 parts of the solvent mixture from Example 1 as described above.

The molar NCO:OH ratio is 1:1.

EXAMPLE 4

(a) An oil-free polyester having an acid number of about 4.5, a hydroxyl number of about 140, an outflow viscosity of 42 seconds (50% in xylene) and a solids content of 74% is prepared from 1,322 parts of hexahydrophthalic acid anhydride, 80 parts of maleic acid anhydride, 498 parts of adipic acid, 1,056 parts of α-ethyl-hexanoic acid and 1,968 parts of trimethylol propane by esterification as in Example 1.

(b) 100 parts of the 74% resin solution are weighed out and diluted by the addition of 0.5 part of the levelling agent, 25.20 parts of a polyisocyanate containing isocyanurate groups and based on isophorone diisocyanate having an isocyanate content of 11.5% (70% in commercial aromatic hydrocarbon solvent), 1.0 part of zinc octoate as catalyst, 1.0 part of the heat stabilizer from Example 1 and 26.8 parts of the solvent mixture from Example 1.

The molar NCO:OH ratio is 1:1.

EXAMPLE 5

(a) An oil-free polyester having an acid number of about 2, a hydroxyl number of about 300 and an outflow viscosity of 57 seconds (50% in ethyl glycol acetate) is prepared from 2,345 parts of hexahydrophthalic acid anhydride and 2,429 parts of trimethylol propane.

(b) A clear lacquer is prepared from 100 parts of the 60% resin solution in xylene, 0.5 parts of levelling agent, 47.2 parts of the polyisocyanate based on hexamethylene diisocyanate and containing isocyanurate groups according to Example 1, 0.15 parts of zinc octoate as catalyst, 1.0 part of the heat stabilizer used in Example 1 and 22.3 parts of the solvent mixture of Example 1. The NCO:OH molar ratio is 1:1.

EXAMPLE 6

(a) 2,175 parts of butyl acetate and 2,175 parts of xylene are introduced into the reaction vessel described in Example 2 and heated to 110° C. A mixture of 3,951 parts of methyl methacrylate, 2,908 parts of butyl acrylate, 2,707 parts of hydroxyethyl methacrylate, 158 parts of acrylic acid and 335 parts of mercaptoethanol is added under a nitrogen atmosphere at 110° C. in the course of four hours.

At the same time, 591 parts of tertiary butyl peroctoate are added separately within five hours. The reaction mixture is then stirred for three hours at 110° C., heated to the reflux temperature of about 140° C. and maintained at this temperature for about one hour. After filtration under pressure, a copolymer resin having a viscosity corresponding to an outflow time (DIN 53211, 60% in xylene) of 267 seconds, an acid number of 12 and a hydroxyl number of about 120 and a solids content of 70.1% is obtained.

(b) This copolymer resin is mixed with the polyester from Example 5 in proportions of 90 parts of copolymer resin to 10 parts of polyester (70% resin solutions in each case) and the mixture is worked-up into a clear lacquer with the addition of 0.5 parts of the levelling agent from Example 1, 24.7 parts of the polyisocyanate from Example 1 based on hexamethylene diisocyanate and containing isocyanurate groups, 0.15 part of zinc octoate as catalyst, 1.0 part of heat stabilizer and 25.6 parts of a solvent mixture of ethyl glycol acetate, butyl acetate and xylene in proportions of 2:1:1 (based in each case on 100 parts of copolymer + polyester resin mixture). The molar NCO:OH ratio is 1:1.

EXAMPLE 7

(a) A polyester resin having an acid number of 7.9, a hydroxyl number of about 120 and a viscosity of 160 mPas (50% in xylene, measured in a falling ball viscometer) is prepared as described above from 1,486 parts of hexahydrophthalic acid anhydride, 1,312 parts of pentaerythritol, 1,250 parts of coconut oil fatty acid and 834 parts of α-ethyl-hexanoic acid.

(b) 100 parts of the 60% resin solution in xylene are weighed out and worked-up into a clear lacquer with the addition of 0.5 part of the levelling agent of Example 1, 12.6 parts of a biuret polyisocyanate based on hexamethylene diisocyanate and having an isocyanate content of 17.3% (75% in ethyl glycol acetate/xylene 1:1), 0.15 part of zinc octoate as catalyst, 1.0 part of the heat stabilizer according to Example 1 and 24.3 parts of the above-described solvent mixture. The molar NCO:OH ratio is 1:1.

EXAMPLE 8

(a) An alkyd resin having an acid number of about 12, a hydroxyl number of about 118 and a viscosity of 130 mPas (50% in xylene, falling ball viscometer) is prepared from 1,820 parts of camphoric acid, 1,238 parts of pentaerythritol, 1,180 parts of coconut oil fatty acid and 786 parts of α-ethyl hexanoic acid.

(b) A clear lacquer is prepared from 100 parts of the 60% resin solution in xylene, 0.5 parts of the levelling agent according to Example 1, 11.9 parts of the biuret polyisocyanate based on hexamethylene diisocyanate according to Example 7 (75% in ethyl glycol acetate/xylene 1:1), 0.5 part of zinc octoate as catalyst, 1.0 part of the heat stabilizer according to Example 1 and 19.8 parts of the described solvent mixture. The molar NCO:OH ratio is 1:1.

EXAMPLE 9

(a) An alkyd resin having an acid number of about 17, a hydroxyl number of about 125 and a viscosity of 790 mPas (50% in xylene, falling ball viscometer) is prepared from 1,731 parts of 3,6-endomethylene-hexahydrophthalic acid, 1,279 parts of pentaerythritol, 1,219 parts of coconut oil fatty acid and 813 parts of α-ethyl-hexanoic acid.

(b) 100 parts of the 60% resin solution in xylene are weighed out and worked-up into a clear lacquer with the addition of 0.5 part of a levelling agent, 11.0 parts of the isocyanurate polyisocyanate based on hexamethylene diisocyanate according to Example 1, 0.5 part of zinc octoate as catalyst, 1.9 parts of the heat stabilizer according to Example 1 and 32.4 parts of the described solvent mixture. The molar NCO:OH ratio is 1:1.

EXAMPLE 10

(a) An alkyd resin having an acid number of about 10.3, a hydroxyl number of 88 and a viscosity of 430 mPas, 50% in xylene (falling ball viscometer) is prepared from 1,790 parts of hexahydrophthalic acid anhydride, 1,636 parts of trimethylol propane, 1,004 parts of coconut oil fatty acid and 425 parts of benzoic acid. 100 parts of the 60% resin solution in xylene are weighed out and worked-up into a clear lacquer with the addition of 0.5 parts of the levelling agent according to Example 1, 13.9 parts of the isocyanurate polyisocyanate based on isophorone diisocyanate according to Example 4 (70% in an aromatic hydrocarbon solvent mixture), 0.15 part of zinc octoate as catalyst, 1.0 part of the heat stabilizer according to Example 1 and 26.5 parts of the described solvent mixture. The molar NCO:OH ratio is 1:1.

EXAMPLE 11

(a) An alkyd resin having an acid number of about 8.9, a hydroxyl number of about 100 and a viscosity of 310 mPas (50% in xylene, falling ball viscometer) is prepared from 1,440 parts of hexahydrophthalic acid anhydride, 1,272 parts of pentaerythritol, 1,081 parts of tall oil fatty acid and 1,077 parts of α-ethyl hexanoic acid.

(b) 100 parts of the 60% resin solution, 0.5 parts of the levelling agent according to Example 1, 8.83 parts of the biuret polyisocyanate based on hexamethylene diisocyanate according to Example 7 (75% in ethyl glycol acetate/xylene 1:1), 0.5 parts of zinc octoate, 1.3 parts of the heat stabilizer according to Example 1 and 24.4 parts of the described solvent mixture are worked-up into a clear lacquer. The molar NCO:OH ratio is 1:1.

EXAMPLE 12

(a) An oil-free polyester having an acid number of about 9.8, a hydroxyl number of about 108 and a viscosity of 720 mPas (50% in xylene, falling ball viscometer) is prepared from 2,387 parts of hexahydrophthalic acid anhydride, 566 parts of adipic acid, 540 parts of ethylene glycol, 907 parts of neopentyl glycol and 519 parts of trimethylol propane.

(b) 100 parts of the 60% resin solution, 0.5 parts of the levelling agent according to Example 1, 9.5 parts of the isocyanurate polyisocyanate based on hexamethylene diisocyanate according to Example 1, 0.2% by weight of zinc octoate, 1.0 part of heat stabilizer and 28.9 parts of solvent mixture are worked-up to form a clear lacquer. The molar NCO:OH ratio is 1:1.

EXAMPLE 13

(a) An oil-free polyester having an acid number of about 15, a hydroxyl number of about 104 and a viscosity of 970 mPas (50% in xylene, falling ball viscometer) is prepared from 768 parts of succinic acid, 951 parts of adipic acid, 2,813 parts of perhydrobisphenol-A and 436 parts of trimethylol propane.

(b) A clear lacquer is prepared as described above from 100 parts of the 60% resin solution, 0.5 part of a levelling agent, 16.7 parts of the isocyanurate polyisocyanate based on isophorone diisocyanate according to Example 4, 0.5 part of zinc octoate, 1.0 part of the heat stabilizer according to Example 1 and 34.6 parts of solvent mixture. The molar NCO:OH ratio is 1:1.

EXAMPLE 14

(a) An oil-free polyester having an acid number of about 13.2, a hydroxyl number of about 105 and a viscosity of 860 mPas (50% in xylene, falling ball viscometer) is prepared from 1,958 parts of hexahydrophthalic acid anhydride, 795 parts of adipic acid, 487 parts of trimethylol propane, 1,046 parts of 1,4-dimethylol cyclohexane, 414 parts of propylene glycol and 225 parts of ethylene glycol.

(b) A clear lacquer is prepared as described above from 100 parts of the 60% resin solution, 0.5 part of the levelling agent according to Example 1, 19.3 parts of the isocyanurate polyisocyanate based on hexamethylene diisocyanate according to Example 1, 0.15 part of zinc octoate, 1.0 part of a heat stabilizer according to Example 1 and 31.8 parts of solvent mixture. The molar NCO:OH ratio is 1:1.

EXAMPLE 15 (Comparison Example)

(a) 5,266 parts of ethyl glycol acetate are introduced into a gas vessel provided with reflux condenser and heating, cooling and dosing apparatus, and heated to 115° C. A mixture of 2,509 parts of styrene, 1,820 parts of butyl acetate, 1,977 parts of hydroxypropyl methacrylate, 104 parts of acrylic acid and 220 parts of mercapto ethanol is introduced at this temperature under a nitrogen atmosphere in the course of four hours. At the same time, 390 parts of tertiary butyl peroctoate and 715 parts of ethyl glycol acetate are added separately from the mixture described above in the course of five hours. The reaction mixture is then stirred for three hours at 115° C., heated to reflux and maintained at this temperature for about one hour. After filtration under pressure, there is obtained a copolymer resin having a viscosity corresponding to an outflow time (DIN 53211, 60% in ethyl glycol acetate) of 145 seconds, an acid number of 13, a hydroxyl number of about 90 and a solids content of 80.7%.

(b) This copolymer resin is mixed with the polyester from Example 1 in the proportions of 80 parts of polyacrylate resin to 20 parts of polyester (in each case as 80% solutions) and worked-up to form a clear lacquer as described in Example 1. The resulting binder is diluted with a 2:1 solvent mixture of ethyl glycol acetate and xylene. The clear lacquers prepared according to Examples 1 to 15 are used immediately after preparation for the application of lacquer top coats on metallic lacquerings. This is carried out by the following procedure:

30 test sheets are passivated by an iron phosphate treatment, primed by the conventional electrolytic immersion method to apply a lacquer primer which is stoved in, and then coated with a conventional stoving filler which is also stoved in.

15 of these pretreated metal sheets are coated with a base lacquer based on acrylate/cellulose acetobutyrate/melamine resins and the remaining 15 with a base lacquer based on acrylate resin/isocyanate resins. Both types of base lacquer contain an aluminum pigment. The sheets are then coated wet-on-wet by spraying with the clear lacquers of Examples 1 to 15 which have been adjusted to a suitable consistency for application (about 20 to 23 seconds from an outflow cup with 4 mm nozzle) by dilution with a 1:1:2 solvent mixture of xylene/butyl acetate/ethyl glycol acetate. After exposure to air for 15 minutes, the coats are hardened at 80° C. in a circulating air oven for 30 minutes. The experiments are carried out in such a manner that the layers of clear lacquer always have thicknesses of from 35 to 40 μm when dry and the total thickness of the multilayered lacquerings when dry is about 120 μm.

The coated plates are stored in an air-conditioned room at 23° C. and 50% atmospheric humidity for 24 hours and then subjected to the following tests:

"Weather-O-meter" with continuous exposure to carbon arc lamp under alternating conditions of 17 minutes dry followed by three minutes rain; blackbody temperature: maximum 65° C. The plates are assessed at the stage when cracks begin to form.

The test results are summarized in the following table.

| On base lacquer of | Clear lacquer according to Example | | | | | | | | | | | | | |
|---|---|---|---|---|---|---|---|---|---|---|---|---|---|---|
| | 1 | 2 | 3 (comparison) | 4 | 5 | 6 | 7 | 8 | 9 | 10 | 11 | 12 | 13 | 14 | 15 (comparison) |
| Polyacrylate/cellulose acetobutyrate/melamine Weather-O-meter (carbon arc lamp) Number of hours after which cracks appear | >2000 | >2000 | <650 | ← | ← | ← | ← | ← | >2000 | → | → | → | → | → | <800 |
| On polyacrylate/isocyanate base lacquer Weather-O-meter (carbon arc lamp) Number of hours after which cracks appear | >2000 | >2000 | <650 | ← | ← | ← | ← | ← | >2000 | → | → | → | → | → | <800 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of producing metal effect lacquerings with improved weather-resistance by multicoat lacquering of substrates, using a clear lacquer as top coat and a lacquer containing metal pigments for producing the outer layer of the multicoat lacquering which is covered by the layer of clear lacquer, characterized in that the clear lacquer used is one in which the main binder is a two-component system of:
   (a) a polyol component consisting essentially of polyester polyols wherein the acid component of the polyester polyol contains not more than about 30% by weight of aromatic carboxylic acids and optionally polyacrylate polyols; and
   (b) a polyisocyanate component containing biuret and/or isocyanurate groups as well as cycloaliphatically-bound and/or aliphatically-bound isocyanate groups optionally blocked with blocking agents for isocyanate groups wherein components (a) and (b) are used in quantities sufficient to provide an NCO:OH equivalent ratio of about 0.8:1 to 2.5:1.

2. The method according to claim 1, characterized in that binder component (a) consists of:
   (i) from about 5 to 100% by weight of polyester polyol having an acid number of from about 0 to 150 and a hydroxyl number of from about 20 to 300; and
   (ii) from about 0 to 95% by weight of a hydroxyl group containing polyacrylate resin having a low aromatic content and a hydroxyl number of from about 20 to 300.

3. The method according to claim 1 or 2, characterized in that the substances used as binder component (a) include both polyester and polyacrylate polyols, the polyacrylate polyol being in the form of a stable dispersion of polymer micro-particles in a solution of the polyester polyol in a lacquer solvent.

4. The method according to claim 1 or 2, characterized in that the clear lacquer is applied wet-on-wet to the lacquer layer containing metal pigments, and the two layers are dried together.

5. A substrate coated with a weather-resistant multi-layered metal effect lacquering comprising at least one lacquer layer containing metal pigments and one lacquer top coat, characterized in that the lacquer top coat has been obtained by coating the substrates having a layer containing metal pigments with a clear lacquer and subsequently drying the clear lacquer, the coated substrate being prepared by the method of claim 1.

6. The method according to claim 1 or 2 wherein the acid component of the polyester polyol contains not more than about 20% by weight of aromatic carboxylic acids.

7. The method according to claim 6 wherein the acid component of the polyester polyol contains not more than about 15% by weight of aromatic carboxylic acids.

8. The method according to claim 1 or 2 wherein the polyester polyols are saturated polyester polyols.

* * * * *